United States Patent
Staudenmaier et al.

(10) Patent No.: US 12,066,501 B2
(45) Date of Patent: Aug. 20, 2024

(54) POWER SUPPLY PEAK CURRENT MEASUREMENT

(71) Applicant: NXP USA, Inc., Austin, TX (US)

(72) Inventors: Michael Andreas Staudenmaier, Munich (DE); Vincent Aubineau, Issy-les-Moulineaux (FR); Michael Rohleder, Unterschleissheim (DE)

(73) Assignee: NXP USA, Inc., Austin, TX (US)

( * ) Notice: Subject to any disclaimer, the term of this patent is extended or adjusted under 35 U.S.C. 154(b) by 4 days.

(21) Appl. No.: 17/205,042

(22) Filed: Mar. 18, 2021

(65) Prior Publication Data
US 2021/0333334 A1    Oct. 28, 2021

(30) Foreign Application Priority Data

Apr. 22, 2020 (EP) ..................................... 20305390

(51) Int. Cl.
*G01R 31/58* (2020.01)
*G01R 19/165* (2006.01)
*G06F 1/28* (2006.01)
*H04L 9/40* (2022.01)

(52) U.S. Cl.
CPC ....... *G01R 31/58* (2020.01); *G01R 19/16571* (2013.01); *G06F 1/28* (2013.01); *H04L 63/0428* (2013.01)

(58) Field of Classification Search
CPC .............. G01R 31/58; G01R 19/16571; G01R 19/2506; G01R 31/31719; G01R 19/04; G01R 19/25; G06F 1/28; G06F 21/72; H04L 63/0428
See application file for complete search history.

(56) References Cited

U.S. PATENT DOCUMENTS

| | | |
|---|---|---|
| 8,667,265 B1 | 3/2014 | Hamlet et al. |
| 9,143,876 B2 | 9/2015 | Kropfitsch et al. |
| 9,258,129 B2 | 2/2016 | Walsh et al. |
| 9,541,603 B2 | 1/2017 | Park et al. |
| 9,996,480 B2 | 6/2018 | Walsh et al. |
| 10,466,275 B1 | 11/2019 | Vundavalli et al. |
| 2003/0149666 A1 | 8/2003 | Davies |

(Continued)

FOREIGN PATENT DOCUMENTS

| | | | | |
|---|---|---|---|---|
| CN | 107462827 A | * | 12/2017 | ....... G01R 19/16552 |
| CN | 107462827 A | | 12/2017 | |

(Continued)

OTHER PUBLICATIONS

Goikoetxea Yanci et al., "Detecting Voltage Glitch Attacks on Secure Devices," 2008 Bio-inspired, Learning and Intelligent Systems for Security, Aug. 4-6, 2008, 6 pages.

(Continued)

*Primary Examiner* — Feba Pothen (57) ABSTRACT

A peak current detector is integrated into a power supply, such as a power management integrated circuit, to detect glitch attacks imposed on the power rails inside the power supply. Integrated circuitry being supplied by the power supply periodically checks the state of the power supply via a secure communication channel to obtain the detected peak current values, which allow the integrated circuitry to detect those attacks and react accordingly to any possible threats.

20 Claims, 8 Drawing Sheets

(56) References Cited

U.S. PATENT DOCUMENTS

| | | | |
|---|---|---|---|
| 2004/0163131 A1* | 8/2004 | Benco | H04W 8/18 |
| | | | 725/132 |
| 2006/0218414 A1 | 9/2006 | Murray | |
| 2007/0260892 A1 | 11/2007 | Paul et al. | |
| 2009/0292918 A1 | 11/2009 | Mori et al. | |
| 2011/0010567 A1 | 1/2011 | Schmitz et al. | |
| 2011/0102136 A1 | 5/2011 | Nakashima | |
| 2012/0044843 A1 | 2/2012 | Levy et al. | |
| 2012/0046015 A1 | 2/2012 | Little | |
| 2012/0223836 A1 | 9/2012 | Moller | |
| 2013/0271125 A1 | 10/2013 | Deak et al. | |
| 2014/0157174 A1 | 6/2014 | Deroberts | |
| 2014/0285318 A1 | 9/2014 | Audeon et al. | |
| 2015/0048684 A1 | 2/2015 | Rooyakkers et al. | |
| 2015/0278556 A1 | 10/2015 | Avni et al. | |
| 2015/0346246 A1 | 12/2015 | Tasher et al. | |
| 2016/0224048 A1 | 8/2016 | Rooyakkers et al. | |
| 2016/0371487 A1* | 12/2016 | Poornachandran | G06F 21/575 |
| 2017/0124330 A1 | 5/2017 | Van Nieuwenhuyze et al. | |
| 2017/0124331 A1 | 5/2017 | Van Nieuwenhuyze et al. | |
| 2018/0113159 A1 | 4/2018 | Nastase et al. | |
| 2018/0164351 A1 | 6/2018 | Nirwan et al. | |
| 2019/0278945 A1* | 9/2019 | Sugahara | G06F 21/755 |
| 2020/0127503 A1 | 4/2020 | Kataoka | |
| 2020/0218322 A1* | 7/2020 | Gray | G06F 3/0416 |
| 2020/0327259 A1 | 10/2020 | Aubineau et al. | |

FOREIGN PATENT DOCUMENTS

| | | |
|---|---|---|
| EP | 2982997 A1 | 10/2016 |
| EP | 3722979 A1 | 10/2020 |
| WO | WO2006121994 A3 | 11/2006 |

OTHER PUBLICATIONS

Wikipedia, "Galois/Counter Mode", downloaded from https://en.wikipedia.org/wiki/Galois/Counter_Mode Jan. 8, 2020, 8 pages.

U.S. Appl. No. 16/813,805, filed Mar. 10, 2020, 17 pages.

Notice of Allowance dated Aug. 5, 2021, 27 pages.

* cited by examiner

POWER SUPPLY PEAK CURRENT MEASUREMENT

TECHNICAL FIELD

The present disclosure relates in general to power supplies and, in particular, to detecting malicious attacks upon integrated circuitry coupled to such power supplies.

BACKGROUND

Electronic devices are designed to operate according to their specification, which defines the operation limits for temperature, supply voltage, clock frequency, etc. Forcing the device to operate out of these specifications can result in injecting a fault, either temporal or permanent, the device's malfunction, or even permanently damaging it. In many applications, the operation of such electronic devices is intended to be performed in a secure manner. Secure electronic devices are often subject to attacks and behavioral analysis in order to inject faults on them and/or extract otherwise secret information. Glitch attacks, i.e., sudden changes on the power supply rails, are a common technique used to inject faults on such secure electronic devices.

Figure 1:
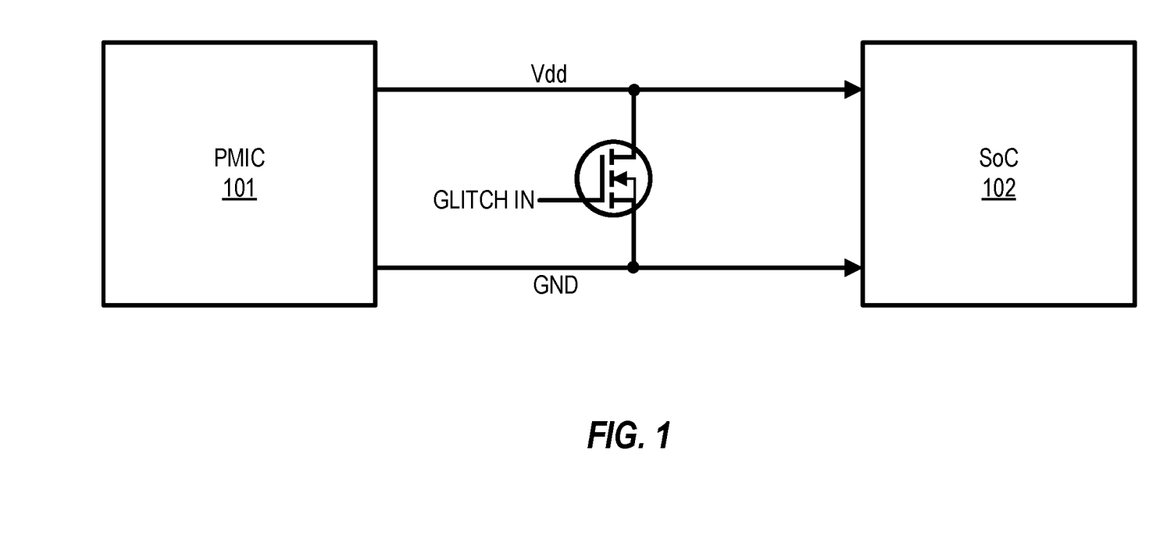
FIG. 1 illustrates an example of a glitch attack on power rails supplying an integrated circuit.

A typical attack scenario used against secure electronic devices, such as a system-on-a-chip ("SoC") is tampering with the power supply provided to the SoC in an attempt to trigger malfunctions to overcome security measures of the device. FIG. 1 illustrates an example of a glitch attack on the power rails supplying an SoC 102 from a power supply 101, such as a power management integrated circuit ("PMIC"). There are various techniques for implementing such glitch attacks. For example, a glitch mechanism may utilize a simple "crowbar" circuit, which applies a short across the power rails of the device for controlled periods of time, the specific waveform generated depending on the target device power supplies. The glitch may be generated with an N-Channel MOSFET, driven using glitch generation circuitry from any appropriate device, such as a pulse generator or appropriately programmed microcontroller.

SUMMARY

Aspects of the disclosure are defined in the accompanying claims.

In a first aspect, there is provided a power supply comprising: circuitry configured to output a voltage signal on a power output line, a peak detector configured to monitor current associated with the voltage signal for an occurrence of a glitch, and circuitry configured to output a signal from the power supply representing the occurrence of the glitch.

In one or more embodiments, the circuitry configured to output the signal may comprise a communication interface configured to encrypt the signal.

In one or more embodiments, the peak detector may comprise a peak current detector circuit that includes a current shunt coupled to the power output line.

In one or more embodiments, the peak detector may comprise a comparator configured to compare an output of the peak current detector circuit to a predetermined threshold value.

In one or more embodiments, the signal may represent an occurrence of the output of the peak current detector circuit exceeding the threshold value.

In one or more embodiments, the peak detector may comprise an analog-to-digital converter configured to produce a digital signal representative of the output of the peak current detector circuit, wherein the comparator may be configured to compare an output of the analog-to-digital converter to the predetermined threshold value.

In one or more embodiments, the peak detector may comprise a digital-to-analog converter configured to convert the predetermined threshold value to an analog value, and an analog comparator configured to compare the analog value to the output of the peak current detector circuit.

In one or more embodiments, the power supply may be implemented as a power management integrated circuit.

In a second aspect, there is provided a method for detecting a glitch occurring on a power output line supplying a voltage signal from a power management integrated circuit ("PMIC"), the method comprising: monitoring of current associated with the voltage signal by a peak detector implemented within the PMIC, encrypting an output of the peak detector, and transmitting the encrypted output from the PMIC.

In one or more embodiments, the method may further comprise: receiving by an integrated circuit the encrypted output from the PMIC, and
entering into a tampered state of operation by the integrated circuit when the encrypted output transmitted from the PMIC indicates that the current associated with the voltage signal has a level that exceeds a predetermined threshold value, wherein the predetermined threshold value represents a maximum current expected to be drawn by the integrated circuit from the PMIC.

In one or more embodiments, the method may further comprise: transmitting the predetermined threshold value from the integrated circuit to the PMIC, and comparing the output from the peak detector to the predetermined threshold value, wherein the encrypted output transmitted from the PMIC to the integrated circuit represents a comparison of the output from the peak detector to the predetermined threshold value.

In one or more embodiments, the method may further comprise sending, by the integrated circuit, a request to the PMIC for the output from the peak detector, wherein the transmitting of the encrypted output from the PMIC is performed in response to the request.

In one or more embodiments, the method may further comprise encrypting the request by the integrated circuit before sending to the PMIC.

In a third aspect, there is provided a power management integrated circuit ("PMIC") comprising: a voltage regulator circuit configured to output a voltage signal onto a power output line, a peak detector configured to measure a current level on the power output line, and a communication interface configured to encrypt an output signal from the peak detector and to transmit the encrypted output signal from the PMIC.

In one or more embodiments, the communication interface may be configured to receive a communication signal representing a threshold value from a source external to the PMIC.

In one or more embodiments, the communication signal may be encrypted, and the communication interface may be configured to decrypt the communication signal to produce the threshold value.

In one or more embodiments, the peak detector may comprise: a digital-to-analog converter configured to convert the threshold value to an analog value, and an analog comparator configured to compare the analog value to the output signal from the peak detector.

In one or more embodiments, the peak detector may comprise: an analog-to-digital convertor configured to convert the output signal from the peak detector to a digital value, and a digital comparator configured to compare the digital value to the threshold value.

In one or more embodiments, the PMIC may be configured to shut off output of the voltage signal onto the power output line in response to the current level exceeding the threshold value.

In one or more embodiments, the peak detector may be configured to detect a glitch attack occurring on the power output line.

DETAILED DESCRIPTION

In accordance with embodiments of the present disclosure, a peak current detector is integrated into a power supply, such as a power management integrated circuit ("PMIC"), to detect glitch attacks imposed on the power rails. An electronic device receiving power from the power supply is notified of the detection of such glitch attacks. For example, an electronic device, such as a system-on-a-chip ("SoC"), may be configured to periodically check the state of the power supply via a secure communication channel and obtain the detected peak current values, which allow the secure electronic device to detect those attacks and react accordingly to the threat. In other embodiments, the power supply may be configured to receive a threshold value from the electronic device and then compare this threshold value to the detected peak current values to determine if a glitch attack has occurred. The power supply may then be configured to send an encrypted message to the electronic device that a glitch attack has occurred.

A possible malicious attack scenario for an integrated circuit (e.g., a SoC, microcontroller, field-programmable gate array ("FPGA"), etc.) is to tamper with the supply voltages provided to the integrated circuit to trigger malfunctions within the device, which may lead to full or partial access to the integrated circuit and possibly other devices controlled by the integrated circuit. In one or more examples, in order to implement such an attack, the power supply may be exchanged with a malicious power supply which is under full control of the attacker. In one or more examples, rather than replace the power supply, a malicious power supply, glitch mechanism, glitch generation circuitry, etc. may be used to connect to the supply terminals of the integrated circuit while the integrated circuit is communicating with the genuine power supply.

Figure 2:
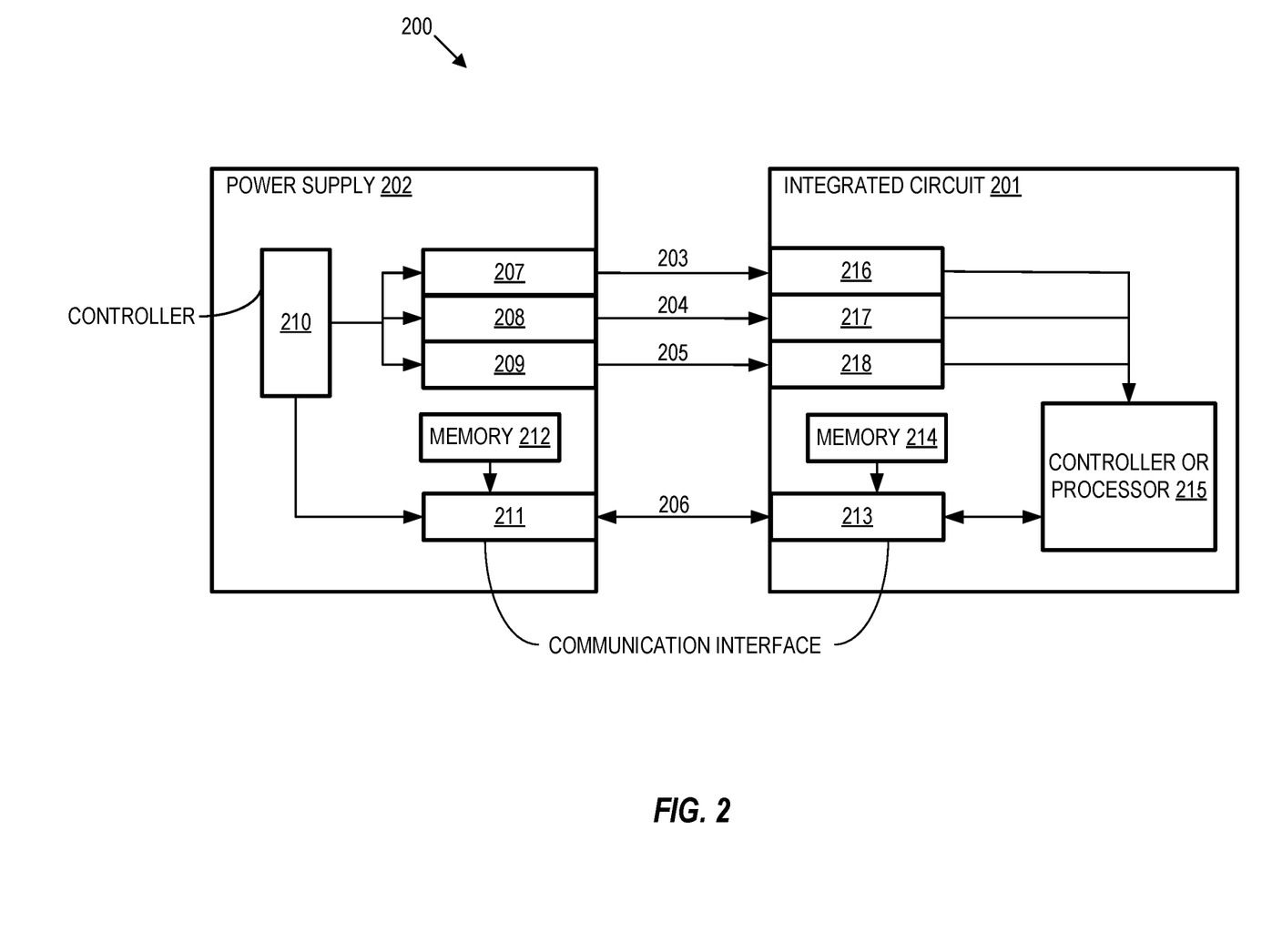
FIG. 2 illustrates a block diagram of an implementation of cryptographic communications between a power supply and an integrated circuit.

FIG. 2 illustrates a system 200 depicting an exemplary architecture in which a power supply is coupled to an electronic device for providing power to the electronic device. The electronic device may be implemented on an integrated circuit 201; and the power supply 202 may also be implemented on an integrated circuit. In accordance with alternative embodiments of the present disclosure, the entire system 200 may be implemented on a single integrated circuit. The integrated circuit 201 may be any electronic system where the prevention of hacking via power attacks is important (e.g., a SoC, microprocessor, microcontroller, multimedia processors, processors utilized in the automotive world, FPGA, or any secure computing elements). The power supply 202 may include a power management integrated circuit ("PMIC") configured to provide regulated power to the integrated circuit 201.

The power supply 202 may be configured to provide power to the integrated circuit 201 by at least one power supply line (also referred to herein as a "power output line"), and in this non-limiting example three power supply lines are provided, including first, second, and third power supply lines 203, 204, 205. The system 200 includes at least one communication channel 206, which provides for communication between the power supply 202 and the integrated circuit 201. In one or more examples, the communication channel may be implemented with more than one communication line. In accordance with alternative embodiments of the present disclosure, the integrated circuit 201 may use one or more of the power supply lines 203, 204, 205 to provide the function of the communication channel. In such an example, appropriate filtering to separate the supplied power from the communication signaling may be required, as will be familiar to those skilled in the art.

The power supply 202 may include a voltage regulator circuit 207, 208, 209 for each power supply line. The voltage regulator circuits may be configured to provide a different regulated voltage over each line. For example, the first voltage regulator circuit 207 may be configured to provide 1.8 V, the second voltage regulator circuit 208 may be configured to provide 2.7 V, and the third voltage regulator circuit 209 may be configured to provide 3.3 V. It will be appreciated that other voltages may be provided. The voltage regulator circuits 207, 208, 209 may be under the control of a controller 210 configured to set the voltages output by the regulator circuits 207, 208, 209.

The controller 210 may be configured to receive signaling from the integrated circuit 201 over the communication channel 206 in an encrypted manner as provided by the encryption/decryption module 211 and a corresponding encryption/decryption module 213 of the integrated circuit 201. For example, the communication between the integrated circuit 201 and the power supply 202 may be based on an i2C communication scheme. The encryption/decryption module 211 may have access to a pre-shared key stored in a secure memory 212 for use in establishing secure communication between the power supply 202 and the integrated circuit 201. The pre-shared key may be programmed into hardware at the time of manufacture, established and stored during commissioning, established and stored during a set-up procedure, obtained in use, or any other suitable manner.

The integrated circuit 201 or, in particular, the encryption/decryption module 213 may have access to a pre-shared key stored in a secure memory 214 for use in establishing secure communication between the power supply 202 and the integrated circuit 201. The pre-shared key may be programmed into hardware at the time of manufacture, established and stored during commissioning, established and stored during a set-up procedure, obtained in use, or any other suitable manner. The pre-shared encryption key may be of symmetric or asymmetric type. The encryption/decryption module 213 may be configured to communicate with a controller or processor 215 of the integrated circuit 201.

The foregoing cryptographic coupling of a PMIC and an SoC is further disclosed within European Patent Application No. EP19305481.4, which is hereby incorporated by reference herein.

The integrated circuit 201 may include a first, second, and third power supply terminal to receive the power supplied over the power supply lines 203, 204, 205. The processor 215 may be configured to receive a measure of the power received over one or more of the power supply lines 203, 204, 205. Accordingly, the integrated circuit 201 may include a voltage or power sensor 216, 217, 218 coupled to the respective first through third power supply terminals for determining the voltage or power supplied by the power supply 202. The power supply information from the sensor(s) may be provided to the processor 215.

In one or more examples, the integrated circuit 201, using the communication channel 206, is configured to provide for encrypted communication between the power supply 202 and the integrated circuit 201 based on the pre-shared encryption key stored in the respective memories 212, 214. As will be further described with respect to FIG. 6, the encrypted communication may be configured to provide for authentication of the power supply 202. If the power supply 202 passes authentication, the integrated circuit 201 may be configured to operate in a normal mode and receive or continue to receive power from the power supply 202. If the power supply 202 fails authentication, the integrated circuit 201 may be configured to enter a tampered state.

A normal mode of operation may include the integrated circuit operating with a first level of functionality, such as all functionality. As used herein, the terms "tamper mode" and "tampered state" refer to any mode of operation by an integrated circuit in which its operation is restricted in some predetermined or preprogrammed manner (for example, by entering into a reset or safe mode, operating with a reduced level of functionality (e.g., relative to the first level of functionality associated with a normal mode of operation), shutting down, disconnecting itself from receiving power from the power supply, and/or transmitting an error, warning, or malfunction message to an external system).

Embodiments of the present disclosure utilize the cryptographic coupling between the power supply and the integrated circuit as described with respect to FIG. 2. In the following description, embodiments are described with respect to a system implementation in which a PMIC is supplying power to an SoC. However, embodiments of the present disclosure are applicable to implementation with any suitable power supply configuration and with any integrated circuit as previously noted herein.

Figure 3:
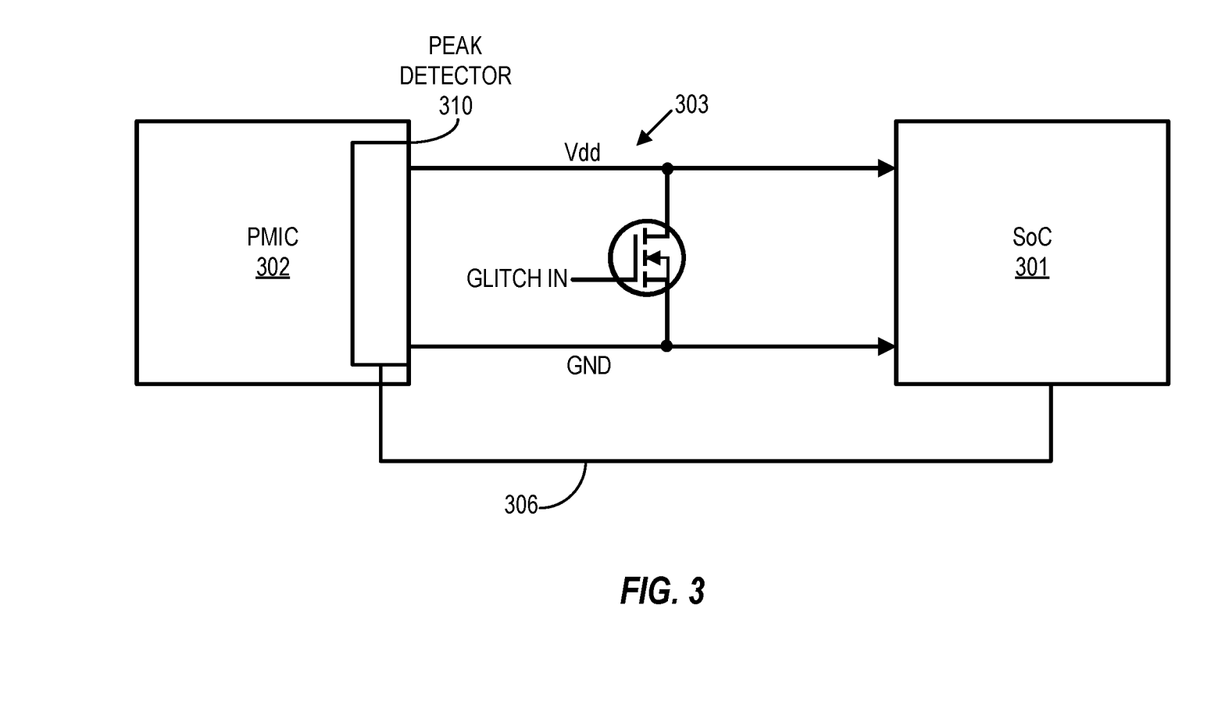
FIG. 3 illustrates a simplified schematic block diagram configured in accordance with embodiments of the present disclosure.

FIG. 3 illustrates a power supply (e.g., PMIC) 302 coupled to an integrated circuit 301 (e.g., SoC). The PMIC 302 may be configured to include similar components as the power supply 202, and the SoC 301 may be configured to include similar components as the SoC 201. Embodiments of the present disclosure further implement a peak detector 310 coupled to the one or more power supply lines on which power is supplied from the PMIC 302 to the SoC 301. For the sake of simplicity, in FIGS. 3-5, embodiments of the present disclosure will be described with respect to a single pair of power lines 303 (Vdd, GND).

FIG. 3 depicts how embodiments of the present disclosure detect an attempt of a glitch attack on the power lines 303. In accordance with embodiments of the present disclosure, the peak detector 310 is integrated into the PMIC 302 (i.e., the peak detector 310 is not implemented as circuitry outside of the PMIC 302) and configured to monitor (e.g., measure) current associated with the voltage signal output onto the power output line in order to detect occurrences of such glitch attacks so that such glitch attacks are detected by circuitry implemented within the PMIC 302. The detection of such glitch attacks is communicated from the peak detector 310 to the SoC 301 as a signal via the communication channel 206. The SoC 301 can be configured to react in a predetermined manner to the detection of such glitch attacks. In accordance with embodiments of the present disclosure, the communication of such glitch attacks from the peak detector 310 in the PMIC 302 to the SoC 301 may be encrypted, such as previously described with respect to FIG. 2.

Figure 4:
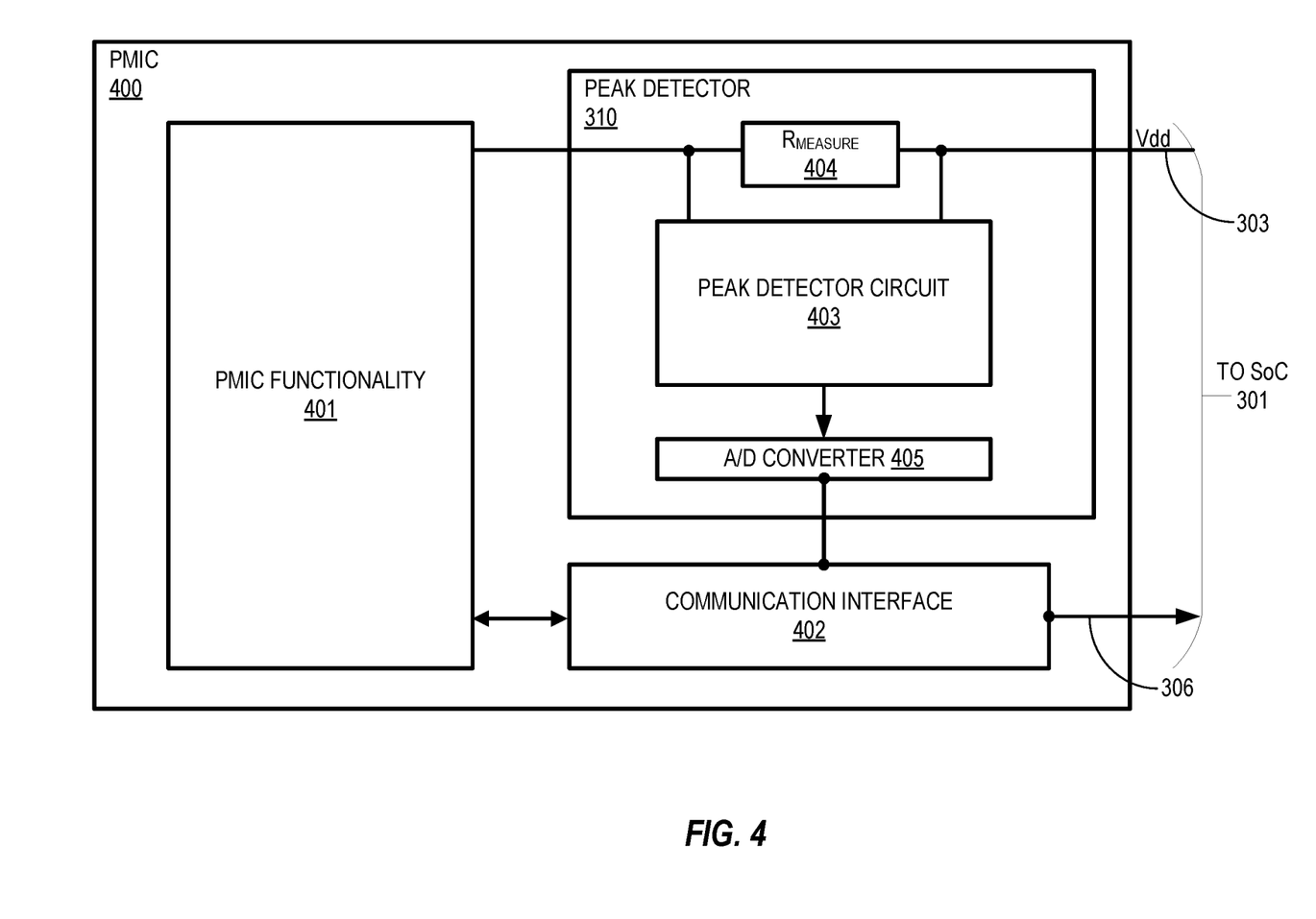
FIG. 4 illustrates a block diagram of a power management integrated circuit configured in accordance with embodiments of the present disclosure.

FIG. 4 illustrates a more detailed block diagram of a PMIC 400 configured in accordance with certain embodiments of the present disclosure. For the sake of simplicity, the SoC 301 is not detailed in this figure, and the ground connection for the power lines 303 between the PMIC 400 and the SoC 301 has been omitted. The PMIC 400 may be configured to perform typical functions for such power supplies. For example, such PMIC functionality 401 may include a controller and one or more voltage regulator circuits, similar to the controller 210 and voltage regulator circuits 207-209 described with respect to FIG. 2. Additionally, the PMIC 400 may be configured with a communication interface 402 for communicating with the SoC 301 over the communication channel 306. In accordance with embodiments of the present disclosure, such communications may be performed in an encrypted manner similarly as described with respect to FIG. 2.

The peak detector 310 is configured with a peak current detector circuit 403 coupled to a current shunt (e.g., a measurement shunt resistor ($R_{Measure}$)) 404 implemented within the PMIC 400. The current shunt 404 is coupled to the power lines 303 to transform the current into a voltage coupled with the peak current detector circuit 403, which may be any such peak current detector circuit suitable for capturing short peaks on the power lines 303. For example, such a peak current detector circuit may be implemented with a capacitor that is charged over a diode as is well-known in the art. Embodiments may additionally include a circuit to reset the sample and hold storage (i.e., discharging the capacitor). Alternatively, such a peak current detector may be implemented with an operational amplifier in a well-known manner.

The voltage values output from the peak current detector circuit 403 may be converted into digital values by an analog-to-digital ("A/D") converter 405. These digital values may then be communicated to the SoC 301 by the communication interface 402 over the communication channel 306. As previously described, the communication interface 402 may encrypt the digital values before transmitting to the SoC 301. The SoC 301 may be pre-programmed to compare these digital values to a predetermined threshold value to determine if a glitch attack has been detected.

The predetermined threshold values disclosed herein may be pre-programmed into the SoC or the PMIC. In accordance with embodiments of the present disclosure, such threshold values may represent a maximum current expected to be drawn by the SoC from the power supply. In certain embodiments, such threshold values may be dependent upon the particular operating mode of the SoC. In certain operating modes, the computing load of the SoC may alter required power consumption of the SoC. As a result, in certain embodiments of the present disclosure, the threshold values may be dynamically varied by the SoC. In this way, embodiments of the present disclosure are capable of detecting glitch attacks even taking into account the potentially varying power consumption of the SoC.

The PMIC 400 may be configured to continuously or periodically send the digital values representing the voltage values measured by the peak current detector circuit 403, or circuitry within the peak detector 310 or the communication interface 402 may be configured to buffer these digital values until they are requested by the SoC 301. Alternatively, the system may be configured so that the digital values are generated by the peak detector 310 in response to a request received by the communication interface 402 from the SoC 301 over the communication channel 306, such as described with respect to FIG. 6.

Figure 5A:
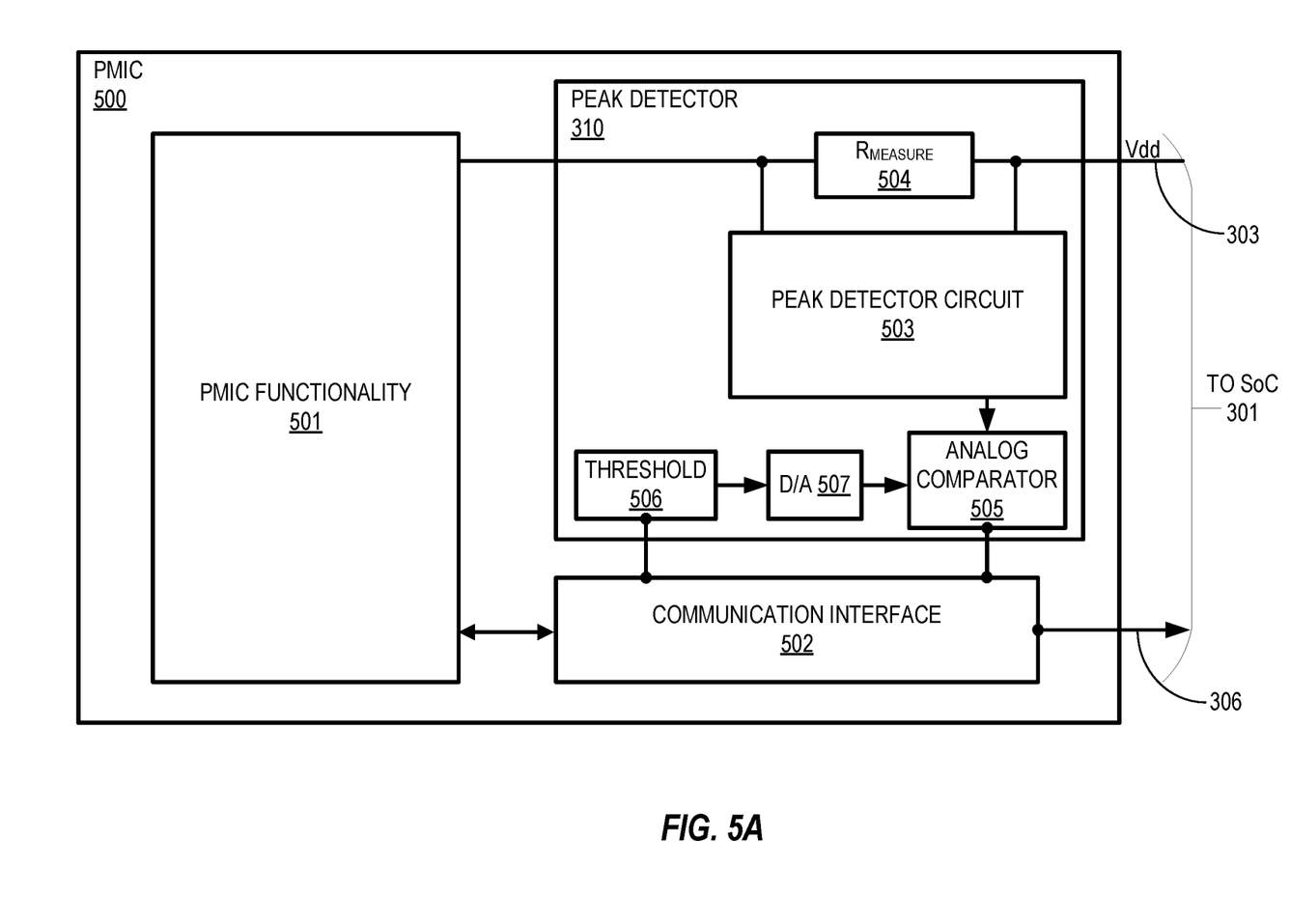
FIG. 5A illustrates a block diagram of a power management integrated circuit configured in accordance with embodiments of the present disclosure.
Figure 5B:
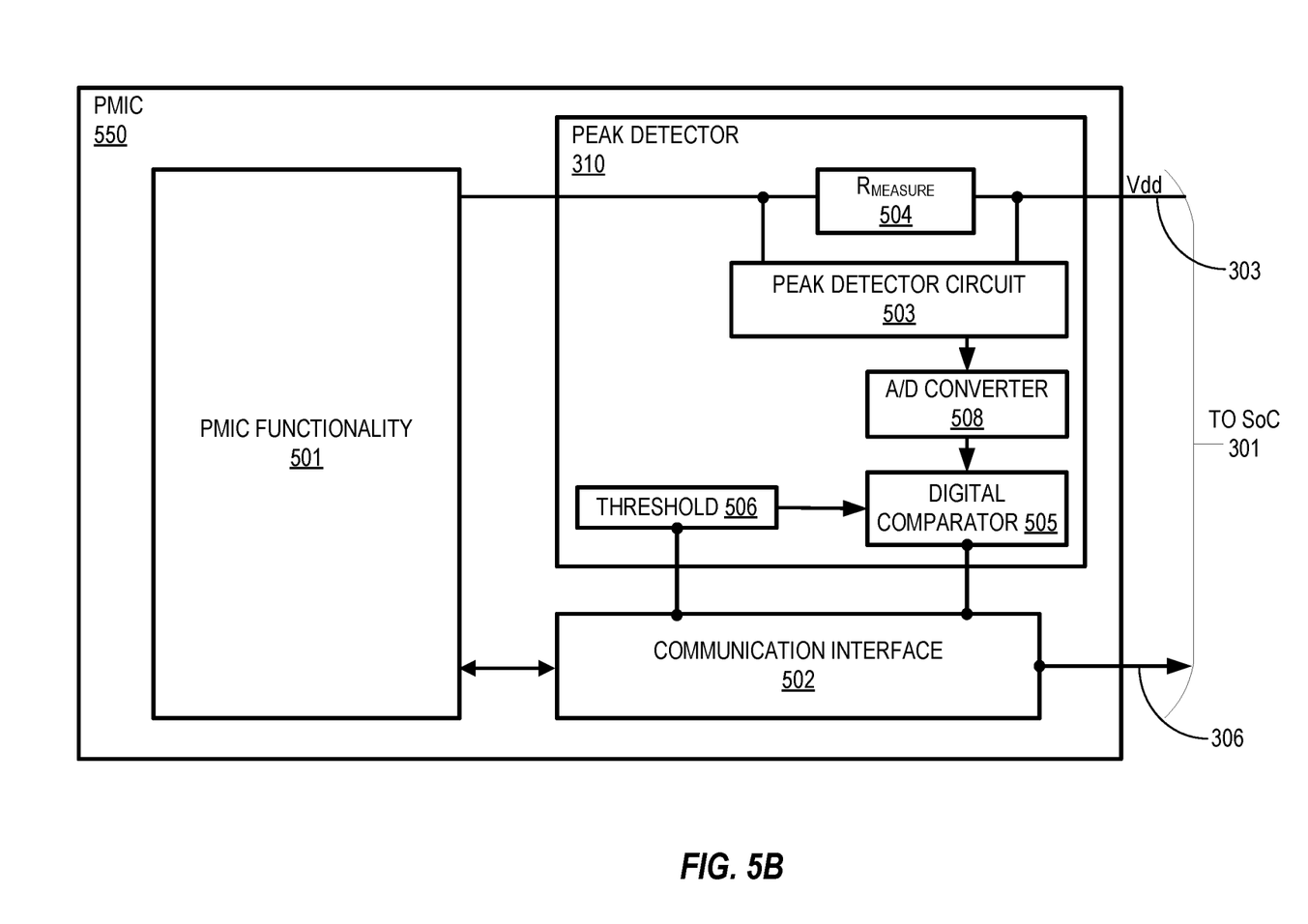
FIG. 5B illustrates a block diagram of a power management integrated circuit configured in accordance with embodiments of the present disclosure.

FIGS. 5A and 5B illustrate embodiments of the present disclosure in which a comparison of measurements by the peak detector circuit to a threshold value are performed within the PMIC.

FIG. 5A illustrates a detailed block diagram of a PMIC 500 configured in accordance with alternative embodiments of the present disclosure. For the sake of simplicity, the SoC 301 is not detailed in this figure. The PMIC 500 may be configured to perform typical functions for such power supplies. For example, such PMIC functionality 501 may include a controller and one or more voltage regulator circuits, similar to the controller 210 and voltage regulator circuits 207-209 described with respect to FIG. 2. Additionally, the PMIC 500 may be configured with a communication interface 502 for communicating with the SoC 301 over the communication channel 306. In accordance with embodiments of the present disclosure, such communications may be performed in an encrypted manner similarly as described with respect to FIG. 2.

In the embodiments configured with respect to the PMIC 500 of FIG. 5, the peak detector 310 is configured with a peak current detector circuit 503 coupled to a measurement shunt resistor ($R_{Measure}$) 504 implemented within the PMIC 500. The shunt resistor 504 is coupled to the power lines 303 to transform the current into a voltage coupled with the peak current detector circuit 503, which may be any such peak current detector circuit suitable for capturing short peaks on the power lines 303. For example, such a peak current detector circuit may be implemented with a capacitor that is charged over a diode as is well-known in the art. Embodiments may additionally include a circuit to reset the sample and hold storage (i.e., discharging the capacitor). Alternatively, such a peak current detector may be implemented with an operational amplifier in a well-known manner.

The voltage values output from the peak current detector circuit 503 are compared by an analog comparator 505 configured to compare these voltage values to a threshold value stored in the threshold memory or register 506. Such a threshold value may have been communicated from the SoC 301 over the communication channel 306. Additionally, the threshold value may be transmitted over the communication channel 306 in an encrypted manner as similarly described with respect to FIG. 2.

The threshold value is converted to an analog value by the digital-to-analog ("D/A") converter 507. This analog version of the threshold value is then compared to the voltage value(s) by the analog comparator 505 (e.g., an operational amplifier), which will output a result of the comparison to the communication interface 502.

If the comparator 505 determines that a voltage value from the peak current detector circuit 503 exceeds the threshold value, it will output a corresponding signal, which is transmitted over the communication channel 306 by the communication interface 502 to the SoC 301, and which may be transmitted in an encrypted manner.

The SoC 301 may be pre-programmed to take appropriate action in response to receipt of the signal received from the PMIC 500 that indicates that a possible glitch attack has occurred on the power lines 303, such as by entering into a tampered state of operation.

Alternatively, the PMIC 500 may be configured so that the signal from the comparator 505 is delivered to the PMIC functionality circuitry 501 so that the PMIC 500 may take appropriate action, such as shutting off output of the voltage signal onto the power output line 303, or resetting of the system.

FIG. 5B illustrates a detailed block diagram of a PMIC 550 configured in accordance with alternative embodiments of the present disclosure. For the sake of simplicity, the SoC 301 is not detailed in this figure. The PMIC 550 may be configured to perform typical functions for such power supplies. For example, such PMIC functionality 501 may include a controller and one or more voltage regulator circuits, similar to the controller 210 and voltage regulator circuits 207-209 described with respect to FIG. 2. Additionally, the PMIC 550 may be configured with a communication interface 502 for communicating with the SoC 301 over the communication channel 306. In accordance with embodiments of the present disclosure, such communications may be performed in an encrypted manner similarly as described with respect to FIG. 2.

In the embodiments configured with respect to the PMIC 550 of FIG. 5B, the peak detector 310 is configured with a peak current detector circuit 503 coupled to a measurement shunt resistor ($R_{Measure}$) 504 implemented within the PMIC 550. The shunt resistor 504 is coupled to the power lines 303 to transform the current into a voltage coupled with the peak current detector circuit 503, which may be any such peak current detector circuit suitable for capturing short peaks on the power lines 303. For example, such a peak current detector circuit may be implemented with a capacitor that is charged over a diode as is well-known in the art. Embodiments may additionally include a circuit to reset the sample and hold storage (i.e., discharging the capacitor). Alternatively, such a peak current detector may be implemented with an operational amplifier in a well-known manner.

The voltage values output from the peak current detector circuit 503 are converted into digital values by an analog-to-digital ("A/D") converter 508 to be compared by digital comparator 505 configured to compare these voltage values to a threshold value stored in the threshold memory or register 506. Such a threshold value may have been communicated from the SoC 301 over the communication channel 306. Additionally, the threshold value may be transmitted over the communication channel 306 in an encrypted manner as similarly described with respect to FIG. 2.

If the comparator 505 determines that a voltage value from the peak current detector circuit 503 exceeds the threshold value, it will output a corresponding signal, which is transmitted over the communication channel 306 by the communication interface 502 to the SoC 301, and which may be transmitted in an encrypted manner.

The SoC 301 may be pre-programmed to take appropriate action in response to receipt of the signal received from the PMIC 550 that indicates that a possible glitch attack has occurred on the power lines 303, such as by entering into a tampered state of operation.

Alternatively, the PMIC 505 may be configured so that the signal from the comparator 505 is delivered to the PMIC functionality circuitry 501 so that the PMIC 505 may take appropriate action, such as shutting off output of the voltage signal onto the power output line 303, or resetting of the system.

Figure 6:
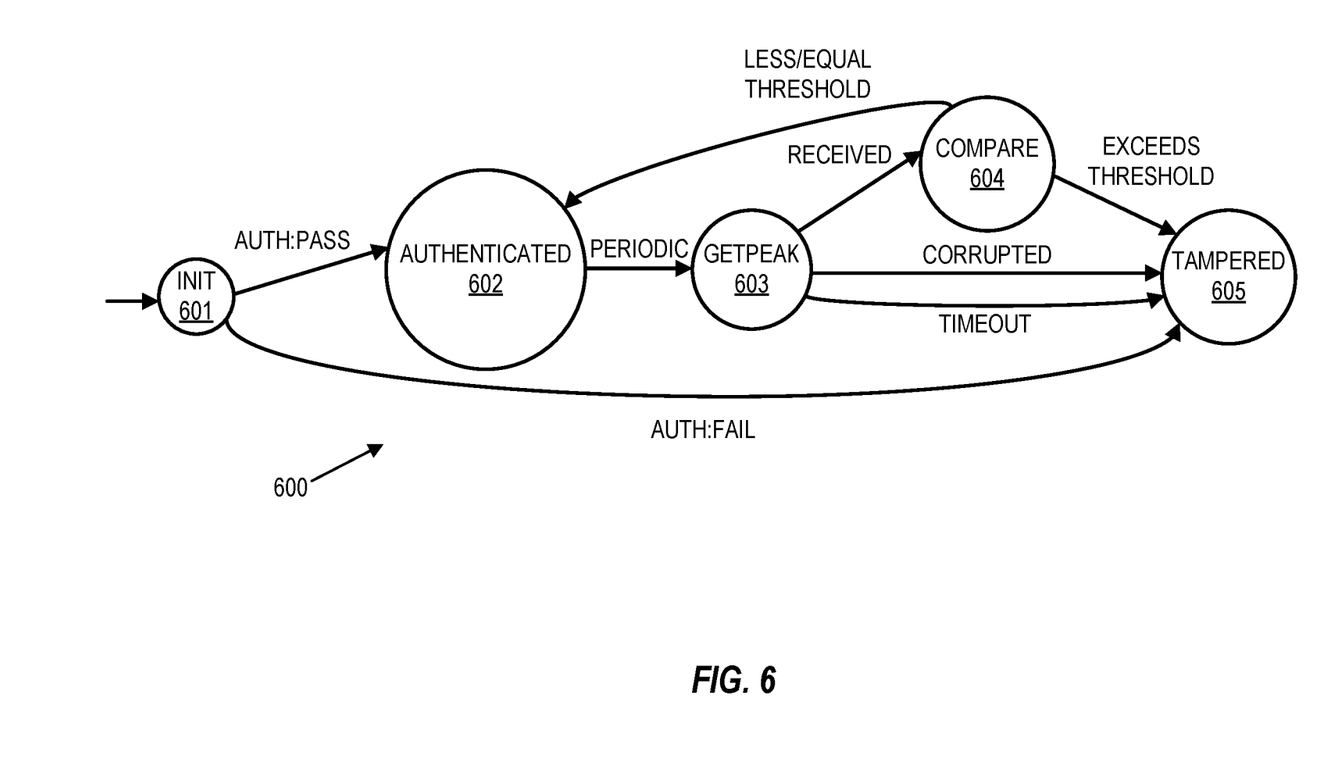
FIG. 6 illustrates a state diagram of a process configured in accordance with embodiments of the present disclosure.

Referring next to FIG. 6, there is illustrated a state diagram of a process 600 that may be implemented with respect to the various embodiments of the present disclosure previously described in FIGS. 2-5.

At start-up, the system may be in an Initializing (Init) state 601, wherein the connection between the PMIC and SoC may be authenticated as previously described with respect to FIG. 2. During this Initializing state 601, the PMIC and SoC may be pre-programmed to communicate between each other one or more encrypted messages to provide for authentication of the PMIC. If the PMIC passes authentication (see the Auth:Pass path), the system enters into an Authenticated state 602 in which the SoC may be configured to operate in a normal mode and receive or continue to receive power from the PMIC. If the PMIC fails authentication (see the Auth:Fail path), the SoC may be configured to enter into a Tampered state 605 of operation. Thus, in accordance with certain embodiments of the present disclosure, the PMIC is securely coupled to the SoC to prevent hackers from replacing it with a malicious power supply to perform attacks (e.g., over/under supply of power, introducing power glitches, etc.). However, the foregoing authentication process is not necessary for implementation of embodiments of the present disclosure.

In further operation when the system has entered into the Authenticated state 602, or anytime that the system is operating in a normal mode, the system may be configured (e.g., with a sequence counter) to periodically enter into a GetPeak state 603 in which the SoC sends a request over the communication channel for an updated peak current value from the PMIC. In case the PMIC does not send a response to this request within a predetermined time period (see the Timeout path) or the response is corrupted (see the Corrupted path) (e.g., the response does not conform to the predetermined cryptographic key exchange), the system may be configured to enter into the Tampered state 605, because it may be assumed that some sort of malicious attack has been attempted on the PMIC.

However, if the SoC does receive a peak current value from the PMIC (see the Received path), the system enters into the Compare state 604 in which this value may be compared against a threshold value, such as previously described with respect to FIG. 4. In case the received peak current value exceeds the threshold value (see the Exceeds Threshold path), the system may enter into the Tampered state 605. In case the received peak current value is less than or equal to the threshold value (see the Less/Equal Threshold path), then the system may return to the Authenticated state 602, or any other state in which the system proceeds with normal operations. The foregoing test cycle may be periodically repeated throughout the entire operation of the system.

In accordance with certain embodiments of the present disclosure, instead of the SoC periodically requesting a peak current value, a continuous stream of updated peak current values may be communicated from the PMIC to the SoC for comparison with the threshold value.

In accordance with certain embodiments of the present disclosure described with respect to FIG. 5, the process 600 may be modified so that the Compare state 604 is performed within the PMIC by the comparator 505.

Figure 7:
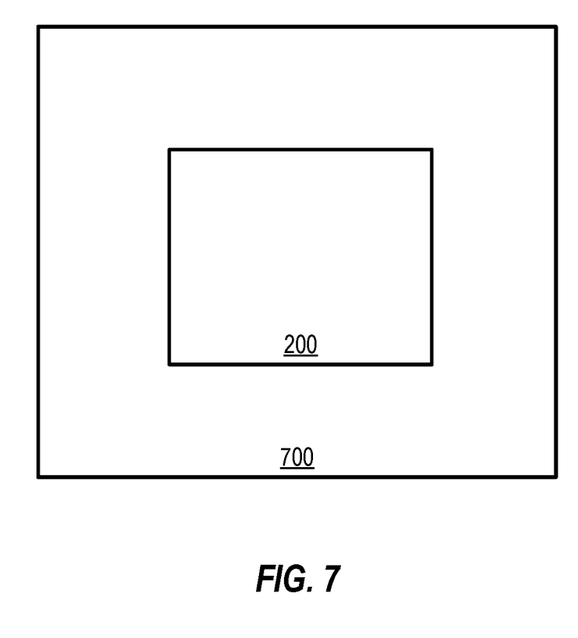
FIG. 7 illustrates a simplified schematic diagram of various possible implementations of the present disclosure.

FIG. 7 illustrates a simplified schematic diagram demonstrating how the system 200 may be implemented as part of an apparatus 700 wherein the integrated circuit 201 is configured to provide functionality for said apparatus. The apparatus 700 may be a vehicle or a radar system for a vehicle, a multimedia system, mobile phones, routers, switches, etc. For example, it may be important to ensure the security of the apparatus 700. It will be appreciated that the system 200 also has application outside the foregoing exemplary fields, and these examples are not intended to limit its application.

Aspects of the present disclosure provide a power supply that includes circuitry configured to output a voltage signal on a power output line, a peak detector configured to monitor current associated with the voltage signal for an occurrence of a glitch, and circuitry configured to output a signal from the power supply representing the occurrence of the glitch. The circuitry configured to output the signal may include a communication interface configured to encrypt the signal. The peak detector may include a peak current detector circuit that includes a current shunt coupled to the power output line. The peak detector may include a comparator configured to compare an output of the peak current detector circuit to a predetermined threshold value. The signal may represent an occurrence of the output of the peak current detector circuit exceeding the threshold value. The peak detector may include an analog-to-digital converter configured to produce a digital signal representative of the output of the peak current detector circuit, wherein the comparator is configured to compare an output of the analog-to-digital converter to the predetermined threshold value. The peak detector may include a digital-to-analog converter configured to convert the predetermined threshold value to an analog value, and an analog comparator configured to compare the analog value to the output of the peak current detector circuit. The power supply may be implemented as a power management integrated circuit.

Aspects of the present disclosure provide a method for detecting a glitch occurring on a power output line supplying a voltage signal from a power management integrated circuit ("PMIC"), wherein the method includes monitoring of current associated with the voltage signal by a peak detector implemented within the PMIC, encrypting an output of the peak detector, and transmitting the encrypted output from the PMIC. The method may further include receiving by an integrated circuit the encrypted output from the PMIC, and entering into a tampered state of operation by the integrated circuit when the encrypted output transmitted from the PMIC indicates that the current associated with the voltage signal has a level that exceeds a predetermined threshold value, wherein the predetermined threshold value represents a maximum current expected to be drawn by the integrated circuit from the PMIC. The method may further include transmitting the predetermined threshold value from the integrated circuit to the PMIC, and comparing the output from the peak detector to the predetermined threshold value, wherein the encrypted output transmitted from the PMIC to the integrated circuit represents a comparison of the output from the peak detector to the predetermined threshold value. The method may further include sending, by the integrated circuit, a request to the PMIC for the output from the peak detector, wherein the transmitting of the encrypted output from the PMIC is performed in response to the request. The method may further include encrypting the request by the integrated circuit before sending to the PMIC.

Aspects of the present disclosure provide a power management integrated circuit ("PMIC") that includes a voltage regulator circuit configured to output a voltage signal onto a power output line, a peak detector configured to measure a current level on the power output line, and a communication interface configured to encrypt an output signal from the peak detector and to transmit the encrypted output signal from the PMIC. The communication interface may be configured to receive a communication signal representing a threshold value from a source external to the PMIC. The communication signal may be encrypted, and wherein the communication interface may be configured to decrypt the communication signal to produce the threshold value. The peak detector may include a digital-to-analog converter configured to convert the threshold value to an analog value, and an analog comparator configured to compare the analog value to the output signal from the peak detector. The peak detector may include an analog-to-digital convertor configured to convert the output signal from the peak detector to a digital value, and a digital comparator configured to compare the digital value to the threshold value. The PMIC may be configured to shut off output of the voltage signal onto the power output line in response to the current level exceeding the threshold value. The peak detector may be configured to detect a glitch attack occurring on the power output line.

A number of embodiments of the disclosure have been described. Nevertheless, it will be understood that various modifications may be made without departing from the spirit and scope of the present disclosure. Accordingly, other embodiments are within the scope of the following claims.

The instructions, states, and/or flowchart steps and paths in FIG. 6 can be executed in any order, unless a specific order is explicitly stated. Also, those skilled in the art will recognize that while one example set of instructions/states/paths has been discussed, the material in this specification can be combined in a variety of ways to yield other examples as well, and are to be understood within a context provided by this detailed description.

In some example embodiments, the various sets of instructions/states/paths described above are implemented as functional and software instructions embodied as a set of executable instructions which are effected on a computer or machine which is programmed with and controlled by said executable instructions. For example, such instructions/states/paths may be loaded for execution on a controller within a power supply (e.g., a controller within a PMIC) and/or an integrated circuit (e.g., a SoC).

In one example, one or more instructions, states, paths, or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

The singular forms "a," "an," and "the" include plural referents unless the context clearly dictates otherwise. As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke a 35 U.S.C. § 112, paragraph six interpretation for that unit/circuit/component.

What is claimed is:

1. A power supply comprising:
   circuitry configured to output a voltage signal on a power output line;
   a peak detector configured to monitor a current associated with the voltage signal for an occurrence of a glitch; and
   wherein the peak detector includes a comparator configured to compare the monitored current to a predetermined threshold value that depends upon a present operating mode of the power supply;
   circuitry configured to output a glitch attack signal from the power supply representing the occurrence of the glitch,
   wherein the glitch attack signal is generated if the monitored current exceeds the threshold value;
   wherein the circuitry configured to output the glitch attack signal includes a communication interface configured to encrypt and transmit the glitch attack signal.

2. The power supply of claim 1,
   wherein the peak detector includes a current shunt coupled to the power output line.

3. The power supply of claim 1:
   wherein the peak detector includes an analog-to-digital converter configured to produce a digital signal representative of the output of the peak current detector circuit,
   wherein the comparator is configured to compare an output of the analog-to-digital converter to the predetermined threshold value.

4. The power supply of claim 1:
   wherein the peak detector includes,
      a digital-to-analog converter configured to convert the predetermined threshold value to an analog value; and an analog comparator configured to compare the analog value to the output of the peak current detector circuit.

5. The power supply of claim 1,
wherein the power supply is a power management integrated circuit.

6. A method for detecting a glitch occurring on a power output line supplying a voltage signal from a power management integrated circuit ("PMIC"), the method comprising:
monitoring of a current associated with the voltage signal using a peak detector within the PMIC;
wherein the peak detector includes a comparator configured to compare the monitored current to a predetermined threshold value that depends upon a present operating mode of the PMIC;
generating encrypting and outputting a glitch attack signal if the monitored current exceeds the threshold value; and
transmitting the encrypted glitch attack signal from the PMIC to indicate that a glitch attack has occurred.

7. The method of claim 6:
wherein the predetermined threshold value represents a maximum current expected to be drawn by the integrated circuit from the PMIC in the present operating mode.

8. The method of claim 6, further comprising:
receiving by an integrated circuit the encrypted output from the PMIC;
entering into a tampered operation mode by the integrated circuit when the encrypted output transmitted from the PMIC indicates that the current associated with the voltage signal has a level that exceeds the predetermined threshold value;
transmitting the predetermined threshold value from the integrated circuit to the PMIC; and
comparing the output from the peak detector to the predetermined threshold value,
wherein the encrypted output transmitted from the PMIC to the integrated circuit represents a comparison of the output from the peak detector to the predetermined threshold value.

9. The method of claim 8, further comprising:
sending, by the integrated circuit, a request to the PMIC for the output from the peak detector,
wherein the transmitting of the encrypted output from the PMIC is performed in response to the request.

10. The method of claim 9,
further comprising encrypting the request by the integrated circuit before sending to the PMIC.

11. A power management integrated circuit ("PMIC") comprising:
a voltage regulator circuit configured to output a voltage signal onto a power output line;
a peak detector configured to measure a current level on the power output line for an occurrence of a glitch;
wherein the peak detector includes a comparator configured to compare the measured current to a predetermined threshold value that depends upon a present operating mode of the PMIC;
circuitry configured to output a glitch attack signal from the PMIC representing the occurrence of the glitch,
wherein the glitch attack signal is generated if the monitored current exceeds the threshold value; and
a communication interface configured to encrypt the glitch attack signal from the peak detector and to transmit the encrypted glitch attack signal from the PMIC to indicate that a glitch attack has occurred.

12. The PMIC as recited in claim 11,
wherein the communication interface is configured to receive a communication signal representing the predetermined threshold value from a source external to the PMIC.

13. The PMIC as recited in claim 12,
wherein the communication signal is encrypted, and
wherein the communication interface is configured to decrypt the communication signal to produce the predetermined threshold value.

14. The PMIC as recited in claim 12,
wherein the peak detector includes,
a digital-to-analog converter configured to convert the threshold value to an analog value; and
an analog comparator configured to compare the analog value to the glitch attack signal from the peak detector.

15. The PMIC as recited in claim 12,
wherein the peak detector comprises:
an analog-to-digital convertor configured to convert the glitch attack signal from the peak detector to a digital value; and
a digital comparator configured to compare the digital value to the predetermined threshold value.

16. The PMIC as recited in claim 12,
wherein the PMIC is configured to shut off output of the voltage signal onto the power output line in response to the current level exceeding the predetermined threshold value.

17. The PMIC as recited in claim 11,
wherein the peak detector is configured to detect a glitch attack occurring on the power output line.

18. The power supply of claim 1:
wherein the predetermined threshold value represents a maximum current expected to be drawn from the power supply in the present operating mode.

19. The power supply of claim 18:
wherein the power supply includes a set of operating modes; and
wherein the peak detector is configured to change the predetermined threshold value when the present operating mode of the power supply changes from a first one of the set of operating modes to a second one of the set of operating modes.

20. The power supply of claim 18:
wherein the power supply is configured to be coupled to an integrated circuit by the communication interface;
wherein the integrated circuit is configured to send a request to the power supply over the communication interface for an updated peak current value; and
wherein the integrated circuit is configured to switch the present operating mode to a tampered mode if the power supply does not send a response to the request.

* * * * *